US006927267B1

(12) United States Patent
Varela de la Rosa et al.

(10) Patent No.: US 6,927,267 B1
(45) Date of Patent: Aug. 9, 2005

(54) HIGH SOLIDS DISPERSION FOR WIDE TEMPERATURE, PRESSURE SENSITIVE ADHESIVE APPLICATIONS

(75) Inventors: Luis Varela de la Rosa, Fort Mill, SC (US); Timothy P Sanborn, Huntersville, NC (US); Dieter Urban, Ludwigshafen (DE)

(73) Assignee: BASF AG, Rheinland-Pralz (DE)

( * ) Notice: Subject to any disclaimer, the term of this patent is extended or adjusted under 35 U.S.C. 154(b) by 173 days.

(21) Appl. No.: 10/092,679

(22) Filed: Mar. 7, 2002

(51) Int. Cl.$^7$ .................. C08F 28/02; C08F 220/10; C08F 212/08
(52) U.S. Cl. .................. 526/287; 526/347; 526/318.42; 526/321; 526/324; 526/318.44; 526/336
(58) Field of Search .................. 526/347, 287, 526/318.42, 321, 324, 318.44, 336, 319

(56) References Cited

U.S. PATENT DOCUMENTS

| | | | |
|---|---|---|---|
| 3,547,852 A | 12/1970 | Burke | |
| 3,697,618 A | 10/1972 | Grunewalder et al. | |
| 3,787,259 A | 1/1974 | Kleinfeld | |
| 3,983,297 A | 9/1976 | Ono et al. | |
| 4,316,830 A | 2/1982 | Mallon | |
| 4,371,659 A | 2/1983 | Druschke et al. | 524/599 |
| 4,424,298 A | 1/1984 | Penzel et al. | 524/747 |
| 4,456,726 A | 6/1984 | Siol et al. | 524/501 |
| 4,617,343 A | 10/1986 | Walker et al. | 524/817 |
| 4,619,964 A | 10/1986 | Kielbania et al. | |
| 4,879,333 A | 11/1989 | Frazee | 524/460 |
| 5,183,841 A | 2/1993 | Bernard | 524/272 |
| 5,196,504 A | 3/1993 | Scholz et al. | 526/318.4 |
| 5,278,227 A | 1/1994 | Bernard | 524/817 |
| 5,322,731 A | 6/1994 | Callahan et al. | 428/327 |
| 5,391,665 A | 2/1995 | Matsunaga et al. | 526/211 |
| 5,405,693 A | 4/1995 | Dittrich et al. | 428/355 |
| 5,430,092 A | 7/1995 | Aydin et al. | 524/458 |
| 5,461,103 A | 10/1995 | Bafford et al. | 524/460 |
| 5,474,638 A | 12/1995 | Kohlhammer et al. | 156/308.2 |
| 5,597,654 A | 1/1997 | Scholz et al. | 428/514 |
| 5,652,289 A | 7/1997 | Eisenhart et al. | 524/376 |
| 5,652,293 A | 7/1997 | Eisenhart et al. | 524/459 |
| 5,994,457 A | 11/1999 | Stanger et al. | 524/800 |
| 6,013,722 A | 1/2000 | Yang et al. | |
| 6,020,062 A | 2/2000 | Questel et al. | 428/354 |
| 6,084,024 A | 7/2000 | Mao et al. | 524/556 |
| 6,087,425 A | 7/2000 | Eisenhart et al. | 524/296 |
| 6,107,382 A | 8/2000 | Williams et al. | 524/272 |
| 6,124,417 A | 9/2000 | Su | 526/318.44 |
| 6,136,903 A | 10/2000 | Su et al. | 524/167 |
| 6,147,165 A | 11/2000 | Lee et al. | 525/330.2 |
| 6,156,335 A | 12/2000 | Rovati et al. | 424/448 |
| 6,197,878 B1 | 3/2001 | Murray et al. | 524/804 |
| 6,214,931 B1 | 4/2001 | Segers et al. | |
| 6,242,552 B1 | 6/2001 | Su | |
| 6,251,213 B1 | 6/2001 | Bartman et al. | 156/327 |
| 6,262,144 B1 | 7/2001 | Zhao et al. | 523/201 |
| 6,274,688 B1 | 8/2001 | Nakagawa et al. | 526/329.7 |
| 6,296,932 B1 | 10/2001 | Crandall et al. | 428/355 |
| 6,306,982 B1 | 10/2001 | Lee et al. | 526/80 |
| 6,376,094 B1 | 4/2002 | Dames et al. | |
| 6,423,805 B1 * | 7/2002 | Bacho et al. | 526/319 |
| 2001/0006628 A1 | 7/2001 | Govil et al. | 424/78.31 |
| 2001/0012551 A1 | 8/2001 | Peloquin et al. | 428/41.5 |
| 2001/0019721 A1 | 9/2001 | Brandt et al. | 424/443 |
| 2001/0019766 A1 | 9/2001 | Masuda et al. | 428/345 |
| 2001/0021452 A1 | 9/2001 | Kishioka et al. | 428/343 |
| 2001/0023264 A1 | 9/2001 | Yamamoto | 522/39 |
| 2001/0025077 A1 | 9/2001 | Scheuermann et al. | 524/458 |
| 2001/0025083 A1 | 9/2001 | Stark et al. | 525/222 |
| 2001/0027241 A1 | 10/2001 | Schuler et al. | 526/271 |
| 2001/0028959 A1 | 10/2001 | Centner et al. | 428/500 |
| 2004/0097638 A1 | 5/2004 | Centner et al. | |

FOREIGN PATENT DOCUMENTS

| | | | |
|---|---|---|---|
| DE | 19649383 | 6/1998 | |
| EP | 454426 A2 | 10/1991 | |
| JP | 60-244993 | 10/1985 | C09J/3/14 |
| JP | 62-060214 | 3/1987 | C09J/3/14 |
| JP | 62-151404 | 6/1987 | C09J/3/14 |
| JP | 62-300346 | 11/1987 | C09J/3/14 |
| JP | 63-018654 | 1/1988 | C09J/3/14 |
| JP | 01-302213 | 11/1989 | C09J/133/08 |
| JP | 05-302587 | 12/1993 | C09J/133/08 |
| JP | 08-170529 | 6/1996 | C09J/133/06 |
| JP | 09-214139 | 7/1997 | C08F/2/24 |
| WO | WO94/14891 | 7/1994 | |
| WO | WO00/68335 | 11/2000 | C09J/133/08 |

OTHER PUBLICATIONS

English Abstract for WO00/68335 on the front page of the International Publication. (2000).
English Abstract DE3920935. (1991).
English Abstract ZA6705372. (1968).
English Abstract for Hongtao et al., Faculty of Chemistry and Material Science, Hubei University, Wuhan 430062, entitled "Preparing of the pressure–sensitive adhesive used for the soft sheet of Polyurethane foams" (2000).

* cited by examiner

*Primary Examiner*—Robert D. Harlan
(74) *Attorney, Agent, or Firm*—Michael F. Morgan

(57) ABSTRACT

A pressure-sensitive adhesive polymer comprising a reaction product of a $C_1$ to $C_{20}$ alkyl (meth)acrylate, an ethylenically unsaturated carboxylic acid, a $C_2$ to $C_8$ hydroxyalkyl (meth)acrylate, a vinyl aromatic, optionally a ethylenically unsaturated monomer containing sulfonic acid, and optionally a vinyl ester of a carboxylic acid. The pressure-sensitive adhesive polymer can provide adhesion and cohesion in a temperature range from −30° C. to 50° C. for the All-temperature pressure-sensitive adhesive market.

56 Claims, No Drawings

HIGH SOLIDS DISPERSION FOR WIDE TEMPERATURE, PRESSURE SENSITIVE ADHESIVE APPLICATIONS

FIELD OF THE INVENTION

The present invention relates to polymers or of their aqueous dispersions as pressure sensitive adhesives.

BACKGROUND OF THE INVENTION

Pressure sensitive adhesives (PSA) are a class of adhesive compositions that are applied with slight pressure, which can be finger pressure, and generally do not undergo a liquid to solid transition in order to hold materials together. PSAs can be solvent-free natural or synthetic resins having a viscoelastic property termed tack. Tack is a property characterized by the rapid wetting of a substrate by a polymer to form an adhesive bond upon brief contact with the substrate under light pressure.

Pressure-sensitive adhesives (PSAs) form a permanent tacky film that, even under slight pressure, sticks to a very wide variety of surfaces. Pressure-sensitive adhesives are used to produce self-adhesive products such as self-adhesive labels, tapes, films, decals, decorative a vinyls, laminates, wall coverings, and floor tiles. Products of this kind are very simple to use and make it possible to work rapidly when bonding. In contrast to contact adhesive compositions, no ventilation times are necessary. Moreover, there is no "open time" within which the adhesive bond must be implemented. The quality of a self-adhesive article depends on whether the internal strength (cohesion) and the sticking of the adhesive film on the surface that is to be bonded (adhesion) are set properly in relation to one another in accordance with the utility.

In the case of pressure-sensitive adhesive labels, for example, the level of pressure-sensitive adhesive cohesion must be sufficient for no stringing and no emergence of glue at the edges to occur in the course of stamping and cutting, since otherwise the cutting tools become soiled and the cut faces sticky. At the same time, the adhesion should be sufficiently high to obtain an adequate bond to the substrate.

Generally, pressure sensitive adhesives can be designed to perform in a broad temperature range, or in a narrow temperature range. When being able to perform in a narrow temperature range, PSAs can be designed to obtain desired properties. When designed for a broad temperature range, generally some properties of the PSA will perform better at a given range within the broad range rather than similarly over the broad range.

In the all temperature market of pressure sensitive adhesives (generally −30° C. to 50° C.), PSAs can achieve adequate adhesion or they can achieve adequate cohesion. In general it is not possible to optimize adhesion and cohesion independently of one another. Trying to optimize one generally reduces the other. It would be desirable to obtain an All-Temperature pressure sensitive adhesive that provides adhesion and tack for a broad temperature range while maintaining cohesion at a high level.

SUMMARY OF THE INVENTION

A pressure-sensitive adhesive polymer comprising a reaction product of a $C_1$ to $C_{20}$ alkyl (meth)acrylate, an ethylenically unsaturated carboxylic acid, a $C_2$ to $C_8$ hydroxyalkyl (meth)acrylate, a vinyl aromatic, optionally a ethylenically unsaturated monomer containing sulfonic acid, and optionally a vinyl ester of a carboxylic acid.

The polymer can be provided in an aqueous dispersion having a polymer content of up to about 75% by weight, and the polymer can be prepared by emulsion polymerization.

Additionally, the pressure-sensitive adhesive polymer can be applied to a substrate.

DETAILED DESCRIPTION

A polymer comprising a reaction product of a $C_1$ to $C_{20}$ alkyl (meth)acrylate, an ethylenically unsaturated carboxylic acid, a $C_2$ to $C_8$ hydroxyalkyl (meth)acrylate, a vinyl aromatic, optionally a ethylenically unsaturated monomer containing sulfonic acid, and optionally a vinyl ester of $C_1$ to $C_{20}$ carboxylic acid. The polymer can be used as a pressure-sensitive adhesive. The polymer can be provided in the form of an aqueous dispersion and have polymer content up to about 75% by weight.

The (meth)acrylates are reaction products of ethylenically unsaturated carboxylic acids and $C_1$ to $C_{20}$ alcohols. Examples of (meth)acrylates include, but are not limited to, methyl (meth)acrylate, ethyl (meth)acrylate, propyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, benzyl (meth)acrylate, 2-ethylhexyl (meth)acrylate, heptyl (meth)acrylate, n-octyl (meth)acrylate, nonyl (meth)acrylate, decyl (meth)acrylate, undecyl (meth)acrylate, dodecyl (meth)acrylate, tridecyl (meth)acrylate, lauryl (meth)acrylate, stearyl (meth)acrylate, isobornyl (meth)acrylate, norbornyl (meth)acrylate, 4-tertbutylcyclohexyl (meth)acrylate, 3,3,5-trimethylcyclohexyl (meth)acrylate, dimethyl maleate, n-butyl maleate, alkylene glycol di(meth)acrylates, ethylene glycol di(meth)acrylate, 1,3-butylene glycol di(meth)acrylate, 1,4-butylene glycol di(meth)acrylate, propylene glycol (meth)acrylate, 1,6-hexanediol di(meth)acrylate, dipropylene glycol di(meth)acrylate, tripropylene glycol di(meth)acrylate, trimethylolpropane tri(meth)acrylate, cyclopentadienyl (meth)acrylate, carbodiimide (meth)acrylate, t-butylaminoethyl (meth)acrylate, 2-t-butylaminoethyl (meth)acrylate, and N,N-dimethylaminoethyl (meth)acrylate.

Examples of ethylenically unsaturated monomers containing at least one carboxylic acid group include, but are not limited to, (meth)acrylic acid, maleic acid, fumaric acid, itaconic acid, ethacrylic acid, crotonic acid, citraconic acid, cinnamic acid, phthalic acid, isophthalic acid, terephthalic acid, tetrahydrophthalic acid, hexahydrophthalic acid, tetrabromophthalic acid, trimellitic acid, pyromellitic acid, 1,4,5,6,7,7-hexachloro-5-norbornene-2,3-dicarboxylic acid, succinic acid, 2,6-naphthalenedicarboxylic acid, glutaric acid, sebacic acid, azelaic acid, 1,4-cyclohexanedicarboxylic acid, and 1,3-cyclohexanedicarboxylic acid.

Examples of hydroxyl containing (meth)acrylates include, but are not limited to, hydroxyethyl (meth)acrylate, hydroxypropyl (meth)acrylates, and hydroxybutyl (meth)acrylates. When reference is made to hydroxyalkyl (meth)acrylates, the reference includes a reference to all possibilities where the hydroxyl group may be attached to the alkyl group.

Examples of vinyl aromatics include, but are not limited to, styrene, α-methyl styrene, o-chlorostyrene, chloromethyl styrene, α-phenyl styrene, styrene sulfonic acid, salts of styrene sulfonic acid, para-acetoxystyrene, divinylbenzene, diallyl phthalate, vinyl toluene, and vinyl naphthalene.

Examples of unsaturated monomers containing at least one sulfonic acid group include, but are not limited to, vinyl sulfonic acid, arylsulfonic acid, sulfopropyl acrylate, (meth) acryloyloxynaphthalenesulfonic acid, 2-acrylamido-2-methylpropanesulfonic acid, acryloyloxybenzenesulfonic acid, and salts of any of these acids. A preferred monomer from this group is sodium vinyl sulfonate.

Examples of vinyl esters of $C_1$ to $C_{20}$ carboxylic acids include, but are not limited to, vinyl acetate, vinyl propionate, vinyl n-butyrate, vinyl laurate, vinyl caprate (n-decanoate), and vinyl stereate (n-octadecanoate). Also included are branched vinyl esters, called versatic acids or vinyl neodecanoates. Examples of these include, but are not limited to, VEOVA™ 9, VEOVA™ 10 (from Shell Chemical Company), vinyl versatate (available as VV-10™), and vinyl pivalate.

In the above monomers, references are made to various acids or salts of these acids. When listed, the reference to the acid also includes a reference to its salts. The salts of these acids include alkali metal salts, alkaline earth metal salts, and ammonium salts.

In a preferred, non-limiting embodiment, the pressure-sensitive adhesive polymer comprises a reaction product by weight of from about 80% to about 99% $C_1$ to $C_{20}$ alkyl (meth)acrylate, from about 0.25% to about 2.5% ethylenically unsaturated carboxylic acid, from greater than 0% to about 3% $C_2$ to $C_8$ hydroxyalkyl (meth)acrylate, from greater than 0% to about 3% vinyl aromatic, from 0% to about 1% ethylenically unsaturated monomer containing sulfonic acid, and from 0% to about 8% vinyl ester of a carboxylic acid.

In a preferred, non-limiting embodiment, the polymer comprises a reaction product of 2-ethylhexyl acrylate, acrylic acid, hydroxypropyl acrylate, styrene, optionally sodium vinyl sulfonate, and optionally vinyl acetate.

In a preferred, non-limiting embodiment, the pressure-sensitive adhesive polymer comprises a reaction product by weight of from about 80% to about 99% 2-ethylhexyl acrylate, from about 0.25% to about 2.5% acrylic acid, from greater than 0% to about 3% hydroxypropyl acrylate, from greater than 0% to about 3% styrene, from 0% to about 1% sodium vinyl sulfonate, and from 0 to about 8% vinyl acetate.

In another preferred, non-limiting embodiment, the pressure-sensitive adhesive polymer comprises a reaction product by weight of from about 0.25% to about 2% acrylic acid, 2% hydroxy propyl acrylate, 2% styrene, 0.2% sodium vinyl sulfonate, from 0% to about 8% vinyl acetate, and the balance of 2-ethylhexyl acrylate.

Preferably, the polymer has a glass transition temperature $T_g \leq -10°$ C. more preferably $\leq -20°$ C., more preferably $\leq -30°$ C., more preferably $\leq -40°$ C., and most preferably $\leq -50°$ C. In preferred embodiments, the glass transition temperature ranges from about $-85$ to $\leq -10°$ C., from $-50$ to $-10°$ C. or from $-40$ to $-20°$ C. In a preferred embodiment, the glass transition temperature ranges from about $-85$ to about $-54°$ C. The glass transition temperature here is the midpoint temperature in accordance with ASTM D 3418-82, determined by means of differential thermal analysis (DSC) [cf. Also Ullmann's Encyclopedia of Industrial Chemistry, page 169, VCH, Weinheim, (1992)].

The polymers can be applied to any substrate, such as rigid or flexible polyolefins, packaging films, glass, corrugated containers, and metals, as a pressure-sensitive adhesive for label and tape applications. The resulting adhesive film can be used as a free film or in conjunction with a carrier material or facestock. Common facestocks include, but are not limited to, papers and films. With tapes, the polymer can be applied to one or both sides of the tape. Typically, the polymer is applied as an aqueous dispersion. After the dispersion is applied, the water is removed by ambient drying or by heated drying.

Additionally, a release liner can be disposed over the polymer. The release liner can be removed to expose the polymer. Any release liner that allows the liner to be removed from the polymer can be used.

The polymers of the present invention and forming the basis of the pressure sensitive adhesive are aqueous polymer dispersions, also called latex. They are prepared preferably by means of free-radically initiated aqueous emulsion polymerization, in which the monomers are emulsified in water with a surface active agent or stabilized by a protective colloid and reacted using emulsion polymerization techniques known in the art.

The polymerization medium can comprise either just water or mixtures of water and water-miscible liquids such as methanol. Preferably, only water is used. It is possible to include the totality of the liquid medium in the initial charge to the polymerization vessel. An alternative option is to include none, or only a portion, of the liquid medium in the initial charge and to add it all, or the remaining portion, continuously or discontinuously, in the course of the polymerization.

The polymers can be made in a seedless semi-batch emulsion polymerization, a seeded emulsion semi-batch polymerization, or a continuous emulsion polymerization. In these polymerizations, the polymers of the present invention can be made as a single stage polymer, a gradient or power-feed polymer, or they can be made as a multiple stage polymer. In the semi-batch polymerizations, some of the polymerization batch can be introduced as initial charge, heated to the polymerization temperature, and then initially polymerized before the remainder of the polymerization batch is supplied in the course of continuing polymerization. The supply of the polymerization batch to the polymerization zone can be made continuously, stepwise, or under a concentration gradient, and usually by way of a plurality of spatially separated feed streams. One or more of these feed streams contain the monomers in pure or emulsified form. The feed of the monomers to the polymerization vessel can be varied over time, as is described in U.S. Pat. No. 4,371,659, which is incorporated herein by reference. Preferably, starting from a given feed rate, the feed rate can be increased by any amount up to about 1,500%, preferably linearly.

The proportion of the monomers in the system to be polymerized, consisting of monomers and liquid medium, may be from 0.1 to 100% by weight, normally $\geq 5$ to 80% by weight, often from 20 to 70% by weight, and frequently from 40 to 60% by weight.

The monomers can preferably be polymerized by a free-radical method or, where possible, by an anionic method. Both free-radical and anionic polymerization are, as customary polymerization methods, familiar to one of ordinary skill in the art.

The emulsion polymerization processes is carried out using ionic and/or nonionic emulsifiers and/or protective colloids and/or stabilizers as surface-active compounds.

Examples of suitable protective colloids are polyvinyl alcohols, cellulose derivatives, or vinylpyrrolidone copolymers. A detailed description of further suitable protective colloids is given in Houben-Weyl, Methoden der organischen Chemie [Methods of organic chemistry], Volume XIV/1, Makromolekulare Stoffe [Macromolecular substances], Georg-Thieme-Verlag, Stuttgart, 1961, pages 411 to 420.

As dispersants it is also possible to use emulsifiers/surface active agents (surfactants), whose relative molecular weights, unlike those of the protective colloids, are usually below 1000 g/mol. Examples of surface active agents (surfactants) that can be used in the present invention include anionic surfactants, nonionic surfactants, and mixtures thereof. In the case where mixtures of surface-active substances are used, the individual components must of course be compatible with one another, which in case of doubt can be checked by means of a few tests beforehand. In general, anionic emulsifiers are compatible with one another and with nonionic emulsifiers. Examples of emulsifiers commonly used are ethoxylated mono-, di- and tri-alkylphenols (EO units: 3 to 50, alkyl: $C_4$ to $C_{12}$), ethoxylated fatty alcohols (EO units: 3 to 50; alkyl: $C_8$ to $C_{36}$) and also alkali metal salts and ammonium salts of alkyl sulfates (alkyl: $C_8$ to $C_{12}$), of sulfuric monoesters with ethoxylated alkanols (EO units: 4 to 30, alkyl: $C_{12}$ to $C_{18}$) and with ethoxylated alkylphenols (EO units: 3 to 50, alkyl: $C_4$ to $C_{12}$), of alkylsulfonic acids (alkyl: $C_{12}$ to $C_{18}$) and of alkylarylsulfonic acids (alkyl: $C_9$ to $C_{18}$). Further suitable emulsifiers may be found in Houben-Weyl, op. cit., pages 192 to 208, and a few are listed below.

Examples of anionic surfactants include, but are not limited to, organosulfates and sulfonates, e.g., sodium and potassium alkyl, aryl, and arylalkyl sulfates and sulfonates, such as sodium 2-ethylhexyl sulfate, potassium 2-ethylhexyl sulfate, sodium nonyl sulfate, sodium lauryl sulfate, potassium methylbenzene sulfonate, sodium dodecylbenzene sulfonate, potassium toluene sulfonate, and sodium xylene sulfonate; higher fatty alcohols, e. g., stearyl, lauryl, etc., which have been ethoxylated and sulfonated; dialkyl esters of alkali metal sulfosuccinic acid salts, such as sodium diamyl sulfosuccinic, sodium dioctyl sulfosuccinic, and sodium dioctyl sulfosuccinic, formaldehyde-naphthalene sulfonic acid condensation products; and alkali metal salts, partial alkali metal salts, free acids of complex organic phosphate esters, and sodium salt of a fatty alcohol ether sulfate (EMULPHOR™ FAS 30 from BASF AG or DISPONIL™ FES 77 from COGNIS, Inc.).

Examples of nonionic surfactants include, but are not limited to, polyethers, e. g., ethylene oxide and propylene oxide condensates that include straight and branched chain alkyl and alkylaryl polyethylene glycol and polypropylene glycol ethers and thioethers; alkylphenoxypoly (ethyleneoxy) ethanols having alkyl groups containing from about 7 to about 18 carbon atoms and having from about 4 to about 240 ethyleneoxy units, such as heptylphenoxypoly (ethyleneoxy) ethanols, nonylphenoxypoly (ethyleneoxy) ethanols; the polyoxyalkylene derivatives of hexitol including sorbitans, sorbides, mannitans and mannides; partial long-chain fatty acids esters, such as the polyoxyalkylene derivatives of sorbitan monolaurate, sorbitan monopalmitate, sorbitan monostearate, sorbitan tristearate, sorbitan monooleate and sorbitan trioleate; the condensates of ethylene oxide with a hydrophobic base, the base being formed by condensing propylene oxide with propylene glycol; sulfur containing condensates, e. g., those prepared by condensing ethylene oxide with higher alkyl mercaptans, such as nonyl, dodecyl, or tetradecyl mercaptan, or with alkylthiophenols wherein the alkyl group contains from about 6 to about 15 carbon atoms; ethylene oxide derivatives of long-chain carboxylic acids, such as lauric, myristic, palmitic, or oleic acids or mixtures of acids, such as tall oil fatty acids; ethylene oxide derivatives of long-chain alcohols such as octyl, decyl, lauryl, or cetyl alcohols; and ethylene oxide/propylene oxide copolymers sold under the tradename PLURONIC™ from BASF AG. Another nonionic surfactant is an organosilanol derivative of tung oil, or linseed oil, or high erucic acid rapeseed oil. These surfactant compositions particularly feature high surface activity in forming stable emulsions of organic/water of various difficult to emulsify materials as compared with conventional emulsifying agents. These silanol-based surfactant compositions are described in U. S. Pat. No. 5,807,922.

Another class of surfactants that can be used are those that are copolymerizable with the monomers described above.

Compounds that have additionally proven themselves as surface-active substances are those of the formula I

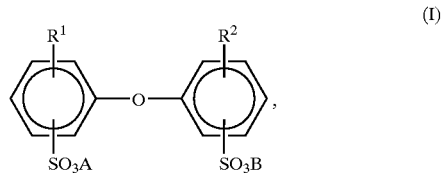

wherein $R_1$ and $R_2$ are hydrogens or $C_4$- to $C_{24}$-alkyl but are not both simultaneously hydrogens, and A and B may be alkali metal ions and/or ammonium ions. In the formula I, $R_1$ and $R_2$ are preferably linear or branched alkyl radicals having 6 to 18 carbon atoms, especially 6, 12, or 16 carbon atoms, or —H, but are not both simultaneously hydrogens. A and B are preferably sodium, potassium or ammonium, particular preference being given to sodium. Particularly advantageous compounds I are those where A and B are sodium, $R_1$ is a branched alkyl radical of 12 carbon atoms, and $R_2$ is hydrogen or $R_1$. Use is frequently made of technical-grade mixtures with a from 50 to 90% by weight fraction of the monoalkylated product, an example being DOWFAX™ 2A1 (trademark of Dow Chemical Company). The compounds of formula I are described in U.S. Pat. No. 4,269,749.

It is of course also possible to use mixtures of emulsifiers and protective colloids as stabilizers. If a stabilizer is used in an emulsion or suspension polymerization process to prepare the polymer, the amount is generally from 0.1 to 3% by weight, based on the monomers for free-radical polymerization.

It is possible to include the totality of the emulsifier and/or protective colloid and/or stabilizer in the initial charge to the polymerization vessel. An alternative option is to include none, or only a portion, of the emulsifier and/or protective colloid and/or stabilizer in the initial charge and to add it all, or the remaining portion, continuously or discontinuously, in the course of the polymerization.

The reaction can be started with any initiator. In the reaction, additional materials that are used in emulsion polymerizations can be included. Examples of additional materials include, but are not limited to, electrolytes, pH adjusting agents, and regulators/chain transfer agents.

Suitable free-radical polymerization initiators for preparing the polymers are all those capable of triggering a free-radical polymerization in the liquid medium. They may in principle comprise peroxides and azo compounds. Also suitable, of course, are redox initiator systems. Suitable reducing agents are listed below. In order to conduct the free-radical polymerization in a particularly efficient manner in respect to both of the desired properties and of high economy, preference is generally given in emulsion polymerization to what are known as water-soluble polymerization initiators, in suspension polymerization to what are known as water-soluble and what are known as oil-soluble polymerization initiators, and in solution and also bulk polymerization to what are known as oil-soluble polymerization initiators. The amount of the free-radical polymerization initiator used, based on the overall amount of the monomers to be polymerized, is preferably from 0.1 to 5% by weight. Suitable oxidizers include, but are not limited to persulfates, ammonium persulfate, sodium persulfate, potassium persulfate, peroxides, benzoyl peroxide, t-butyl hydroperoxide, hydrogen peroxide, cumic hydroperoxide, and azobisisobutyronitrile. It is also possible to use two or more different initiators in the course of the emulsion polymerization.

The manner in which the free-radical polymerization initiator is supplied to the polymerization vessel in the course of the polymerization process is familiar to the person of ordinary skill in the art. The free-radical polymerization initiator may either be included entirely in the initial charge to the polymerization vessel or else added continuously or in stages at the rate at which it is consumed in the course of the free-radical polymerization process of the invention. In each individual case this would depend, in a manner known to the skilled worker, on factors including the chemical nature of the at least one polymerization initiator, the monomer system to be polymerized, the liquid medium, and the polymerization temperature.

In the case of the feed technique the individual components can be supplied to the reactor from above, laterally or from below, through the reactor base.

The emulsion polymerization produces aqueous polymer dispersions having, in general, solids contents of 15 to 75% by weight, preferably from 40 to 75% by weight.

For a high space-time yield of the reactor, dispersions of very high solids content are preferred. In order to make it possible to obtain solids contents >60% by weight, a bimodal or polymodal particle size distribution should be established, since otherwise the viscosity becomes too high and the dispersion can no longer be handled. A new generation of particles can be produced, for example, by adding seed (see U.S. Pat. No. 4,456,726, which is incorporated herein by reference), by adding excess emulsifier or by adding miniemulsions. A further advantage associated with low viscosity at high solids content is the improved coating characteristics at high solids contents. The production of (a) new particle generation(s) can be carried out at any desired point in time. It is guided by the particle-size distribution that is on desired for a low viscosity.

Any temperature that allows the monomers to react to form a polymer can be used as a reaction temperature. Generally, to prepare the polymer, the entire range from 0 to 200° C. is suitable as the reaction temperature, although it is preferred to employ temperatures from 70 to 150° C., preferably from 80 to 120° C., and with particular preference from 85 to 100° C. The process of preparing the polymer may be conducted at a pressure less than, equal to or greater than 1 bar (absolute), so that the polymerization temperature may exceed the boiling temperature of the liquid medium and may be up to 200° C. In general, when using a liquid medium having a boiling temperature of ≦100° C. at 1 bar (absolute) or when using volatile monomers, polymerization is carried out under superatmospheric pressure. In this case the pressure may be 1.2, 1.5, 2, 5, 10, 15 bar or higher. If the process of the invention is conducted under subatmospheric pressure, then pressures of 950 mbar, frequently 900 mbar and often 850 mbar (absolute) are established. It is advantageous to conduct the polymer preparation under an inert gas atmosphere, such as under nitrogen or argon, for example.

Electrolytes that can be included in the reaction include, but are not limited to, ammonium, alkali metal, and alkaline earth metal carbonates.

In the course of the polymerization it is also possible to use regulators/chain transfer agents by means of which the molecular mass of the polymer is reduced. Suitable examples are compounds containing a thiol group, such as tert-butyl mercaptan, thioglycolic acid, mercaptoethanol, mercaptopropyltrimethoxysilane, or tert-dodecyl mercaptan. The proportion of these regulators may in particular be up to 0.3% by weight, preferably from 0.02 to 0.2% by weight, based in each case on the overall amount of the ethylenically unsaturated monomers used for the polymerization.

In the course of the polymerization it is also possible to use monomers that normally increase the internal strength of the films formed from the polymers of the invention. These usually have at least one epoxy, hydroxyl, N-methylol, or carbonyl group or at least two nonconjugated ethylenically unsaturated double bonds. Examples thereof include, but are not limited to, N-alkylolamides of alpha, beta.-monoethylenically unsaturated carboxylic acids having $C_3$ to $C_{10}$ atoms, among which very particular preference is given to N-methylolacrylamide and N-methylolmethacrylamide, and their esters with alkanols having 1 to 4 carbon atoms. Also suitable, in addition, are monomers having two vinyl radicals, monomers having two vinylidene radicals, and monomers having two alkenyl radicals. Particularly advantageous in this context are the di-esters of dihydric alcohols with alpha, beta.-mono ethylenically unsaturated mono carboxylic acids among which acrylic and methacrylic acid are preferred. Examples of such monomers having two non-conjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylates, and also divinylbenzene, vinyl methacrylate, vinyl acrylate, allyl methacrylate, allyl acrylate, diallyl maleate, diallyl fumarate, methylenebisacrylamide, and cyclopentadienyl acrylate. The above mentioned monomers are incorporated by copolymerization usually in amounts of up to 10% by weight, often of up to 5% by weight, based in each case on the overall amount of the monomers to be polymerized.

At the end of the reaction, typically a redox system, which includes an oxidizing agent and a reducing agent, is added to the reaction product to drive the reaction to further completion to reduce the amount of residual monomers. Alternatively, any system that reduces residual monomer content can be used. Examples include, but are not limited to, stripping with steam, vacuum, use of adsorbent materials, and combinations thereof.

Oxidizers that can be included in the redox system include, but are not limited to, peroxides, t-butyl hydroperoxide, hydrogen peroxide, pinane hydroperoxide, dibenzoyl peroxide, cumol hydroperoxide, peroxodisulfuric acid, salts of peroxodisulfuric acid, agents that donate oxygen with free radical formation, alkali metal chlorates, alkali metal perchlorates, transition metal oxide compounds, potassium permanganate, manganese dioxide, lead oxide, lead tetraacetate, iodobenzene. Reducing agents that can be included in the redox system include, but are not limited to, sodium formaldehyde sulfoxylate, erythorbic acid, bisulfites, sodium metabisulfite, sodium bisulfite, adducts of a 3 to 8 carbon ketone with the bisulfite ion, adducts of a 3 to 8 carbon ketone with sulfurous acid, reducing sugars, ascorbic acid, sulfinic acids, hydroxymethane-sulfinic acid, alkane sulfinic acids, isopropane sulfinic acid. Additional redox systems are described in U.S. Pat. No. 5,994,457, which is incorporated herein by reference. These compounds are usually employed in the form of aqueous solutions, the lower concentration being determined by the amount of water which is acceptable in the dispersion and the upper concentration by the solubility of the relevant compound in water.

Before the addition of post reaction additives to prepare specific desired compositions, the reaction products (the aqueous polymer dispersions) of the present invention generally have a total solids content of from about 15 to about 75%, preferably from about 40% to about 75%, more preferably from 60 to 75%, and a pH from about 1.5 to about 7. The particle size can generally range from about 100 nm to about 1,500 nm. The particle size distribution can be uni- or poly-modal.

Optionally, a tackifier, in other words a resin which enhances tack, can be added to the polymers or to the aqueous dispersions of the polymers: Tackifiers are known, for example, from Adhesive Age, July 1987, page 19–23 or Polym. Mater. Sci. Eng. 61 (1989), page 588–592.

Examples of tackifiers are natural resins, such as rosins and their derivatives produced by disproportionation or isomerization, polymerization, dimerization and/or hydrogenation. They can be present in their salt form (for example with mono- or polyvalent counterions (cations)) or, preferably, in their esterified form. Alcohols used for the esterification-can be monohydric or polyhydric. Examples are methanol, ethanediol, diethylene glycol, triethylene glycol, 1,2,3-propanetriol or pentaerythritol.

Also used, furthermore, as tackifiers are hydrocarbon resins, for example indene-coumarone resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, α-methylstyrene or vinyltoluene.

Other compounds increasingly being used as tackifiers are polyacrylates of low molar weight. These polyacrylates preferably have a weight-average molecular weight $M_w$ of below 30,000. At least 60%, in particular at least 80% by weight of the polyacrylates preferably consists of $C_1$–$C_8$ alkyl (meth)acrylates.

Preferred tackifiers are natural or chemically modified rosins. Rosins consist primarily of abietic acid or derivatives thereof.

The tackifiers can be added in a simple manner to the novel polymers, preferably to the aqueous dispersions of the polymers. In this case the tackifiers are preferably themselves in the form of an aqueous dispersion.

The amount by weight of the tackifiers is preferably from 5 to 100 parts by weight, particularly preferably from 10 to 50 parts by weight, based on 100 parts by weight of polymer (solids/solids).

The compositions of the present invention may further contain additional additives. The additives can be any additive that may be generally included with an emulsion polymerization reaction product or any additive that may be used to make a specific composition, or any additive used to prepare pressure sensitive adhesives. Further additives include, but are not limited to, antifoams, plasticizers, surfactants, wetting agents, protective colloids, fillers, coloring agents, antiseptics, biocides, dispersing agents, thickening agents, thixotropic agents, antifreezing agents, pH adjusting agents, corrosion inhibitors, ultraviolet light stabilizers, crosslinking promoters, antioxidants, and other polymers.

Examples of surfactants and wetting agents include, but are not limited to, the surfactants listed above, sulfosuccinates, fluorinated surfactants, silicone surfactants, and nonionics such as ethoxylated octyl- and nonyl-phenols.

Examples of protective colloids are partially and fully hydrolyzed polyvinyl alcohol, hydroxyethyl cellulose, hydroxymethyl cellulose, ethylhydroxyethyl cellulose, carboxymethyl cellulose, ethoxylated starch derivatives, polyacrylic acid, alkali metal polyacrylates, polyacrylamide, poly (methyl vinyl ether/maleic anhydride), polyvinylpyrrolidone, water soluble starch, glue, gelatin, water soluble alginates, guar, gum arabic, and gum tragacanth. The amount of protective colloids used in the composition varies depending upon the intended application and generally ranges from about 0.1 weight percent to about 2 weight percent based on the total weight of the composition.

Examples of fillers include talc, calcium carbonate, diatomaceous earth, mica, kaolin, barium sulfate, magnesium carbonate, fumed silica, vermiculite, graphite, alumina, silica, and rubber powder. Coloring agents such as titanium dioxide and carbon black can also be used as the fillers. The amount of the filler generally ranges from about 5 weight percent to about 50 weight percent based on the total weight of the composition of the present invention.

Various organic pigments and inorganic pigments may be broadly used as the coloring agents, but non-toxic anticorrosive pigments are preferred. Examples of such pigments are phosphate-type anticorrosive pigments such as zinc phosphate, calcium phosphate, aluminum phosphate, titanium phosphate, silicon phosphate, and ortho-and fused phosphates of these; molybdate-type anticorrosive pigments such as zinc molybdate, calcium molybdate, calcium zinc molybdate, potassium zinc molybdate, potassium zinc phosphomolybdate and potassium calcium phosphomolybdate; and borate-type anticorrosive pigments such as calcium borate, zinc borate, barium borate, barium meta-borate and calcium meta-borate. Also, any color pigment, effect pigment, or color and effect pigment may be used. The amount of the coloring agent used may also be properly selected based on the end-use application of the compositions of the present invention.

Examples of the antiseptics are pyrrole compounds, imidazole compounds, thiazole compounds, pyridine compounds and organic halogen compounds. The amount of the antiseptic can be suitably selected, and is, for example, up to about 4 percent by weight based on the total weight (as solids content) of the composition.

Examples of the biocides, which are used either as wetstate protectors or as film protectors of a coating composition, are a wide variety of bactericides, fungicides or algicides, and include, but are not limited to, zinc oxide, cuprous oxide, organotin pigments, copolymers of organotin esters of methacrylic acid with acrylates, tributyl tin oxide, and mixtures thereof. Other examples of biocides particularly useful as wet-state protectors are oxazolidines, organosulfurs, and benzisothiazolins. Any general toxic agent may be suitable as a biocide.

The dispersing agents include, but are not limited to, inorganic dispersing agents such as sodium salts of polycarboxylic acids, sodium or ammonium salts of fused naphthalene sulfonate, polyoxyalkylene alkyl ethers of phenol ether, sorbitan fatty acid esters, polyoxyalkylene fatty acid esters, glycerin fatty acid esters, polyoxyethylene styrene phenol, sodium tripolyphosphate and sodium hexametaphosphate. Organosilanol derivatives of tung oil, or linseed oil, or high erucic acid rapeseed oil that are useful as surfactants are also suitable as dispersing agents. The amount of the dispersing agent generally ranges up to about 10 weight percent based on the total weight of the composition.

The thickening and thixotropic agents may be one and the same or different and may be the same as the protective colloids referred to above. Examples of thickening or thixotropic agents are polyvinyl alcohol, cellulose derivatives such as hydroxyethyl cellulose, hydroxypropyl cellulose and carboxymethyl cellulose salt, polyether compounds, urethane modified polyether compounds, polycarboxylic acid compounds, sodium salts of polycarboxylic compounds, polyvinylpyrrolidone, polyoxyethylene derivatives such as polyethylene glycol ether and polyethylene glycol distearate, sodium alginate and inorganic materials such as sodium silicate and bentonite. The amounts of the thickening or the thixotropic agents can be properly chosen depending upon the type of end-application of the composition of the present invention.

Examples of the pH adjusting agents include, but are not limited to, sodium hydroxide, potassium hydroxide, sodium hydrogen carbonate, ammonium hydroxide, ammonia, amines, triethanolamine, and 3-dimethylaminoethanol. The amount of the pH adjusting agent is selected such that the composition has a desired pH.

Examples of the crosslinking promoters include, but are not limited to, carbodiimides.

For use as a (pressure-sensitive) adhesive, the polymers and aqueous dispersions or aqueous formulations of the present invention can be applied by customary methods known to those of ordinary skill in the art, for example by roll coating, knife coating, wire-wound rod coating, gravure, slot die, curtain coating, spraying etc., to substrates such as paper, release coated paper, or polymer films, preferably consisting of polyethylene, polypropylene, which can be coaxially or monoaxially oriented, polyethylene terephthalate, polyvinyl chloride, polystyrene, polyamide or metal. The water can be removed preferably by drying with forced air ovens or by infrared. Temperatures for drying can typically range from 50 to 150° C. When applied to a facestock or carrier film in a pressure-sensitive label application, the (pressure-sensitive) adhesive can be covered with a release paper, for example with a siliconized paper.

When used as adhesives, the polymers of the present invention exhibit improved cohesion coupled with essentially unchanged adhesion and tackiness.

Properties of the polymer of the present invention are a 180° peel on polyethylene at room temperature of from about 70 N/m (0.4 lb/in) to about 210 N/m (1.2 lb/in), a 180° peel on corrugated paper at room temperature of from about 175 N/m (1.0 lb/in) to about 438 N/m (2.5 lb/in), a 180° peel on polyethylene at −23.3° C. (−10° F.) of from about 8.7 N/m (0.05 lb/in) to about 35 N/m (0.2 lb/in), a 180° peel on corrugated paper at −23.3° C. (−10° F.) of from about 175 N/m (1.0 lb/in) to about 438 N/m (2.5 lb/in), and a shear on stainless steel of from about greater than 50 minutes, preferably from greater than 50 minutes to about 2000 minutes. The test procedures used for determining these properties are ASTM P3330-78 or/and PSTC-1 for peel adhesion, and ASTM D3654 and/or PSTC-7 for shear.

In any of the ranges provided in the above specification, any value within the range may be selected.

Specific Embodiments of the Invention

The invention is further described in the following examples. The examples are merely illustrative and do not in any way limit the scope of the invention as described and claimed.

Several compositions according to the present invention were prepared and tested. In the examples below, the amount of styrene, hydroxy propyl acrylate, and sodium vinyl sulfonate were kept constant for all compositions. Based on parts per hundred monomer (pphm), the amount of styrene was 2, the amount of hydroxy propyl acrylate was 2, and the amount of sodium vinyl sulfonate was 0.2. The amount of vinyl acetate was varied from 0 to 5, the amount of acrylic acid was varied from 0.25 to 1, and the amount of 2-ethylhexyl acrylate was varied so that the total monomers added to 100. The amounts of monomer present in each reaction are given in Table 1 below. The initiator used was sodium persulfate (0.6 phm), and the surfactant used was a sodium salt of a fatty alcohol ether sulfate (DISPONIL™ FES 77 from Cognis, Inc.) (0.9 phm).

TABLE 1

| No. | % 2-EHA | % VA | % AA | Shear, min | 180° Peel @ Room Temp., N/m (Lb/in) | | 180° Peel @ −23.3° C. (−10° F.), N/m (Lb/in) | |
|---|---|---|---|---|---|---|---|---|
| | | | | | PE film | Corr. Paper | PE film | Corr. Paper |
| 1 | 94.8 | 0 | 1.00 | 54 | 108.6 (0.620) | 239.9 (1.370) | 26.3 (0.150) | 164.6 (0.940) |
| 2 | 93.05 | 2 | 0.75 | 53 | 96.3 (0.550) | 238.2 (1.360) | 36.8 (0.210) | 259.2 (1.480) |
| 3 | 92.55 | 3 | 0.25 | 56 | 96.8 (0.553) | 263.9 (1.507) | 22.8 (0.130) | 280.2 (1.600) |
| 4 | 91.05 | 4 | 0.75 | 112 | 121.9 (0.696) | 248.7 (1.420) | 40.3 (0.230) | 273.4 (1.561) |
| 5 | 90.8 | 4 | 1.00 | 243 | 99.8 (0.570) | 217.2 (1.240) | 35 (0.200) | 129.6 (0.740) |
| 6 | 90.55 | 5 | 0.25 | 72 | 172 (0.982) | 241 (1.376) | 14 (0.080) | 78.8 (0.450) |
| 7 | 90.30 | 5 | 0.50 | 161 | 135.9 (0.776) | 299.8 (1.712) | 17.5 (0.100) | 70.1 (0.400) |
| 8 | 90.05 | 5 | 0.75 | 231 | 131.3 (0.754) | 251.7 (1.437) | 26.3 (0.150) | 175.1 (1.000) |

The compositions in the above examples were tested. The test methods used to evaluate the examples of the invention are those described by the American Society for Testing and Materials and in Test Methods for Pressure for Pressure Sensitive Tapes, 8$^{th}$ Ed. 1985, Pressure Sensitive Tape Council.

The dispersion to be tested was diluted to 60% weight of polymer, and 0.75% (wet basis) of a wetting agent (LUMITEN™ I-DS, from BASF AG) was added, and pH was adjusted to 7 with NaOH. A rheology modifier (POLYACRYL™ BR-100 from Polyacryl, Inc.) was added to adjust the viscosity of the system from 1,000 to 2,500 cPs. The mixture was applied to siliconized paper in a thin film, using a doctor blade, and was dried at 90° C. for 3 minutes. The gap height of the doctor blade was chosen so that the weight per unit area of the dried adhesive was 20–22 g/m$^2$. White commercial label paper (basis weight 80 g/m$^2$) was placed on the dried adhesive and rolled on firmly using a manual roller. The resulting label laminate was cut into 1.27 cm(0.5 inch) wide strips for shear testing and 2.54 cm (1 inch) wide for peel and tack testing. Prior to testing, the strips were stored at 23° C. and 50% relative atmospheric humidity for at least 24 hours. Testing was performed under these ambient conditions as well.

Shear holding strength is a measure of the cohesiveness of an adhesive. It is based on applying a constant standard load and measuring the time to pull an adhesive strip from a stainless steel test panel in a direction parallel to their surface. This property is expressed in minutes, and was measured according to ASTM D3654-78, or PSTC-7. Typically, polymers in the All-Temperature pressure-sensitive adhesive market have a shear <50 min.

Peel adhesion is the force required to remove an adhesive strip from a test panel measured at a fixed angle and rate of removal. The force is expressed in Newtons per 25 mm width of coated sheet. The property was measured according to ASTM P3330-78 or PSTC-1 at room temperature and at −23.3° C. (−10° F.) on polyethylene film and corrugated paper. The results are given in Table 1 above.

The pressure sensitive adhesives of the invention displayed a balanced proportion between effective adhesion and high cohesion.

The composition presented in Table 1 produced pressure sensitive adhesives with an adhesion, 1800 Peel at room temperature and −23.3° C. (−10° F.), comparable to that of products currently available in the pressure-sensitive adhesives market but, with an improved cohesion that was at least twice that found in the All-Temp pressure sensitive adhesives market. This improved cohesion will translate into better convertibility.

It should be appreciated that the present invention is not limited to the specific embodiments described above, but includes variations, modifications and equivalent embodiments defined by the following claims.

What is claimed is:

1. A pressure-sensitive adhesive polymer comprising a reaction product of a $C_1$ to $C_{20}$ alkyl (meth)acrylate, an ethylenically unsaturated carboxylic acid, a $C_2$ to $C_8$ hydroxyalkyl (meth)acrylate, a vinyl aromatic, an ethylenically unsaturated monomer containing sulfonic acid, and optionally a vinyl ester of a carboxylic acid.

2. The pressure sensitive adhesive polymer of claim 1, wherein the $C_1$ to $C_{20}$ alkyl (meth)acrylate is selected from the group consisting of methyl (met)acrylate, ethyl (meth) acrylate, propyl (meth)acrylate, n-butyl (meth)acrylate, isobutyl (meth)acrylate, t-butyl (meth)acrylate, pentyl (meth)acrylate, hexyl (meth)acrylate, cyclohexyl (meth) acrylate, benzyl (meth)acrylate, 2-ethylhexyl (meth) acrylate, heptyl (meth)acrylate, n-octyl (meth)acrylate, nonyl (meth)acrylate, decyl (meth)acrylate, undecyl (meth) acrylate, dodecyl (meth)acrylate, tridecyl (meth)acrylate, lauryl (meth)acrylate, stearyl (meth)acrylate, isobornyl (meth)acrylate, norbomyl (meth)acrylate, 4-tertbutylcyclohexyl (meth)acrylate, 3,3,5-trimethylcyclohexyl (meth)acrylate, dimethyl maleate, n-butyl maleate, alkylene glycol di(meth)acrylates, ethylene glycol di(meth)acrylate, 1,3-butylene glycol di(meth) acrylate, 1,4-butylene glycol di(meth)acrylate, propylene glycol (meth)acrylate, 1,6-hexanediol di(meth)acrylate, dipropylene glycol di(meth)acrylate, tripropylene glycol di(meth)acrylate, trimethylolpropane tri(meth)acrylate, cyclopentadienyl (meth)acrylate, carbodiimide (meth) acrylate, t-butylaminoethyl (meth)acrylate, 2-t-butylaminoethyl (meth)acrylate, N,N-dimethylaminoethyl (meth)acrylate, and mixtures thereof.

3. The pressure sensitive adhesive polymer of claim 1, wherein the ethylenically unsaturated carboxylic acid is selected from the group consisting of (meth)acrylic acid, maleic acid, fumaric acid, itaconic acid, ethacrylic acid, crotonic acid, citraconic acid, cinnamic acid, phthalic acid, isophthalic acid, terephthalic acid, tetrahydrophthalic acid, hexahydrophthalic acid, tetrabromophthalic acid, trimellitic acid, pyromellitic acid, 1,4,5,6,7,7-hexachloro-5-norbornene-2,3-dicarboxylic acid, succinic acid, 2,6-naphthalenedicarboxylic acid, glutaric acid, sebacic acid, azelaic acid, 1,4-cyclohexanedicaiboxylic acid, 1,3cyclohexanedicaiboxylic acid, and mixtures thereof.

4. The pressure sensitive adhesive polymer of claim 1, where the $C_2$ to $C_8$ hydroxyalkyl (meth)acrylate is selected from the group consisting of hydroxyethyl (meth)acrylate, hydroxypropyl (meth)acrylate, hydroxybutyl (meth) acrylate, and mixtures thereof.

5. The pressure sensitive adhesive polymer of claim 1, wherein the vinyl aromatic is selected from the group consisting of styrene, α-methyl styrene, o-chlorostyrene, chloromethyl styrene, α-phenyl styrene, styrene sulfonic acid, salts of styrene sulfonic acid, para-acetoxystyrene, divinylbenzene, diallyl phthalate, vinyl toluene, vinyl naphthalene, and mixtures thereof.

6. The pressure sensitive adhesive polymer of claim 1, wherein the ethylenically unsaturated monomer containing sulfonic acid is selected from the group consisting of vinyl sulfonic acid, arylsulfonic acid, sulfopropyl acrylate, (meth) acryloyloxynaphthalenesulfonic acid, 2-acrylamido-2-methylpropanesulfonic acid, acryloyloxybenzenesulfonic acid, salts of any of the preceding, and mixtures thereof.

7. The pressure-sensitive adhesive polymer of claim 1, where ion the polymer further comprises in the reaction product a monomer that is at least one of a monomer having at least two nonconjugated ethylenically unsaturated double bonds and a monomer that has at least one of an epoxy group, a hydroxyl group, a N-methylol group, and a carbonyl group.

8. The pressure-sensitive adhesive polymer of claim 7, wherein the monomer is reacted into the reaction product in an amount up to about 10% by weight of the reaction product.

9. The pressure-sensitive adhesive polymer of claim 1, wherein the polymer further comprises in the reaction product a monomer selected from the group consisting of N-alkylolamides of alpha, beta-monoethylenically unsaturated carboxylic acids having 3–10 carbon atoms; esters of N-alkylolamides of alpha-, beta-monoethylenically unsaturated carboxylic acids having 3 to 10 carbon atoms with alkanols having 1 to 4 carbon atoms; monomers having two vinyl radicals; monomers having two vinylidene radicals; monomers having two alkenyl radicals; di-esters of dihydric alcohols with alpha, beta-mono ethylenically unsaturated mono carboxylic acids; N-methylolacrylamide; N-methylolmethacrylamide; alkylene glycol di(meth)acrylates; ethylene glycol diacrylate; 1,2-propylene glycol diacrylate; 1,3-propylene glycol diacrylate; 1,3-butylene glycol diacrylate; 1,4-butylene glycol diacrylate; ethylene glycol dimethacrylate; 1,2-propylene glycol dimethacrylate; 1,3-propylene glycol dimethacrylate; 1,3-butylene glycol dimethacrylate; 1,4-butylene glycol dimethacrylate; divinylbenzene; vinyl methacrylate; vinyl acrylate; allyl methacrylate; ally acrylate; diallyl maleate; diallyl fumarate; methylenebisacrylamide; cyclopentadienyl acrylate, and mixtures thereof.

10. The pressure sensitive adhesive polymer of claim 1, wherein the polymer comprises a reaction product of a $C_1$ to $C_{20}$ alkyl (meth)acrylate, an ethylenically unsaturated carboxylic acid, a $C_2$ to $C_8$ hydroxyalkyl (meth)acrylate, a vinyl aromatic, a ethylenically unsaturated monomer containing sulfonic acid, and a vinyl ester of a carboxylic acid.

11. The pressure sensitive adhesive polymer of claim 1, wherein the polymer comprises a reaction product of 2-ethylhexyl acrylate, acrylic acid, hydroxypropyl acrylate, styrene, sodium vinyl sulfonate, and optionally vinyl acetate.

12. The pressure sensitive adhesive polymer of claim 1, wherein the polymer comprises a reaction product of 2-ethylhexyl acrylate, acrylic acid, hydroxypropyl acrylate, styrene, sodium vinyl sulfonate, and vinyl acetate.

13. The pressure sensitive adhesive polymer of claim 1, wherein the polymer comprises a reaction product by weight of from about 80% to about 99% $C_1$ to $C_{20}$ alkyl (meth) acrylate, from about 0.25% to about 2.5% ethylenically unsaturated carboxylic acid, from greater than 0% to about 3% $C_2$ to $C_8$ hydroxyalkyl (meth)acrylate, from greater than 0% to about 3% vinyl aromatic, from greater than 0% to about 1% ethylenically unsaturated monomer containing sulfonic acid, and from 0% to about 8% vinyl ester of a carboxylic acid.

14. The pressure sensitive adhesive polymer of claim 1, wherein the polymer comprises a reaction product by weight of from about 80% to about 99% $C_1$ to $C_{20}$ alkyl (meth) acrylate, from about 0.25% to about 2.5% ethylenically unsaturated carboxylic acid, from greater than 0% to about 3% $C_2$ to $C_8$ hydroxyalkyl (meth)acrylate, from greater than 0% to about 3% vinyl aromatic, from greater than 0% to about 1% ethylenically unsaturated monomer containing sulfonic acid, and from greater than 0% to about 8% vinyl ester of a carboxylic acid.

15. The pressure sensitive adhesive polymer of claim 1, wherein the polymer comprises a reaction product by weight of from about 80% to about 99% 2-ethylhexyl acrylate, from about 0.25% to about 2.5% acrylic acid, from greater than 0% to about 3% hydroxypropyl acrylate, from greater than 0% to about 3% styrene, from greater than 0% to about 1% sodium vinyl sulfonate, and from 0% to about 8% vinyl acetate.

16. The pressure sensitive adhesive polymer of claim 1, wherein the polymer comprises a reaction product by weight of from about 85% to about 96% 2-ethylhexyl acrylate, from about 0.25% to about 2% acrylic acid, from greater than 0% to about 3% hydroxypropyl acrylate, from greater then 0% to about 3% styrene, from greater than 0% to about 1% sodium vinyl sulfonate, and 0% to about 8% vinyl acetate.

17. The pressure sensitive adhesive polymer of claim 1, wherein the polymer comprises a reaction product by weight of from about 85% to about 96% 2-ethylhexyl acrylate, from about 0.25 to about 2% acrylic acid, from greater than (0% to about 3% hydroxypropyl acrylate, from greater than 0% to about 3% styrene, from greater than 0% to about 1% sodium vinyl sulfonate, and from than 0% to about 8% vinyl acetate.

18. The pressure sensitive adhesive polymer of claim 1, wherein the polymer comprises a reaction product by weight of from about 85.8% to about 95.55% 2-ethylhexyl acrylate, from about 0.25 to about 2% acrylic acid, about 2% hydroxypropyl acrylate, about 2% styrene, about 0.2% sodium vinyl sulfonate, and from 0% to about 8% vinyl acetate.

19. The pressure sensitive adhesive polymer of claim 1, wherein the polymer comprises a reaction product by weight of from about 85.8% to about 95.55% 2-ethylhexyl acrylate, from about 0.25 to about 2% acrylic acid, about 2% hydroxypropyl acrylate, about 2% styrene, about 0.2% sodium vinyl sulfonate, and from greater than 0% to about 8% vinyl acetate.

20. The pressure sensitive adhesive polymer of claim 1 further comprising at least one of a tackifier, an antifoam, a plasticizer, a surfactant, a wetting agent, a protective colloid, filler, a coloring agent, an antiseptic, a biocide, a dispersing agent, a thickening agent, a thixotropic agent, an antifreeze agent, a pH adjusting agent, a corrosion inhibitor, an ultraviolet light stabilizer, a crosslinking promoter, an antioxidant, and another polymer.

21. The pressure sensitive adhesive polymer of claim 1, wherein the polymer has a glass transition temperature $\leq -10°$ C.

22. The pressure-sensitive adhesive polymer of claim 1, wherein the polymer has a glass transition temperature ranging from about $-85°$ C. to $-10°$ C.

23. The pressure-sensitive adhesive polymer of claim 1, wherein the polymer has a glass transition temperature ranging from about $-85°$ C. to $-54°$ C.

24. The pressure-sensitive adhesive polymer of claim 11, wherein the polymer has a glass transition temperate $\leq -10°$ C.

25. The pressure-sensitive adhesive polymer of claim 11, wherein the polymer has a glass transition temperature ranging from about $-85°$ C. to $-10°$ C.

26. The pressure-sensitive adhesive polymer of claim 11, wherein the polymer has a glass transition temperature ranging from about $-85°$ C. to $-54°$ C.

27. The pressure-sensitive adhesive polymer of claim 1, wherein the polymer has at least one of:
   a. a 180° peel as measured by ASTM 3330 on polyethylene at room temperature of from about 70 N/m (0.4 lb/in) to a 210 N/m (1.2 lb/in),
   b. a 180° peel as measured by ASTM 3330 on corrugated paper at room temperature of from about 175 N/m (1.0 lb/in) to about 438 N/m (25 lb/in),
   c. a 180° peel as measured by ASTM 3330 on polyethylene at $-23.3°$ C. ($-10°$ F.) of from about 8.7 N/m (0.05 lb/in) to about 35 N/m (0.2 lb/in),
   d. a 180° as measured by ASTM 3330 on corrugated paper at $-23.3°$ C. ($-10°$ F.) of from about 175 N/m (1.0 lb/in) to about 438 N/m (2.5 lb/in), and
   e. a shear holding strength as measured by ASTM D3654 of from 50 minutes to about 2000 minutes.

28. The pressure-sensitive adhesive polymer of claim 1, wherein the polymer has:
   a. a 180° peel as measured by ASTM 3330 on polyethylene at room temperature of from about 70 N/m (0.4 lb/in) to about 210 N/m (1.2 lb/in), b. a 180° peel as measured by ASTM 3330 on corrugated paper at room temperature of from about 175 N/m (1.0 lb/in) to about 438 N/m (2.5 lb/in), c. a 180° peel as measured by ASTM 3330 on polyethylene at −23.3° C. (−10° F.) of from about 8.7 N/m (0.05 lb/in) to about 35 N/m (0.2 lb/in), d. a 180° peel as measured by ASTM 3330 on corrugated paper at −23.3° C. (−10° F.) of from about 175 N/m (1.0 lb/in) to about 438 N/m (2.5 lb/in), and e. a shear holding strength as measured by ASTM D3654 of from 50 minutes to about 2000 minutes.

29. The pressure-sensitive adhesive polymer of claim 11, wherein the polymer has at least one of:

a. a 180° peel as measured by ASTM 3330 on polyethylene at room temperature of from about 70 N/m (0.4 lb/in) to about 210 N/m (1.2 lb/in), b. a 180° peel as measured by ASTM 3330 on corrugated paper at room temperature of from about 175 N/m (1.0 lb/in) to about 438 N/m (2.5 lb/in), c. a 180° peel as measured by ASTM 3330 on polyethylene at −23.3° C. (−10° F.) of from about 8.7 N/m (0.05 lb/in) to about 35 N/m (0.2 lb/in), d. a 180° peel as measured by ASTM 3330 on corrugated paper at −23.3° C. (−10° F.) of from about 175 N/m (1.0 lb/in) to about 438 N/m (2.5 lb/in), and e. a shear holding strength as measured by ASTM D3654 of from 50 minutes to about 2000 minutes.

30. The pressure-sensitive adhesive polymer of claim 11, wherein the polymer has:

a. a 180° as measured by ASTM 3330 on polyethylene at room temperature of from about 70 N/m (0.4 lb/in) to about 210 N/n (1.2 lb/in), b. a 180° peel as measured by ASTM 3330 on corrugated paper at room temperature of from about 175 N/m (1.0 lb/in) to about 438 N/m (2.5 lb/in), c. a 180° peel as measured by ASTM 3330 on polyethylene at −23.3° C. (−10° F.) of from about 8.7 N/m (0.05 lb/in) to about 35 N/m (0.2 lb/in), d. a 180° peel as measured by ASTM 3330 on corrugated paper at −23.3° C. (−10° F.) of from about 175 N/m (1.0 lb/in) to about 438 N/m (2.5 lb/in), and e. a shear holding strength as measured by ASTM D3654 of from 50 minutes to about 2000 minutes.

31. An aqueous dispersion comprising the pressure-sensitive adhesive polymer of claim 1.

32. The aqueous dispersion of claim 31 further comprising at least one of a tackifier, an antifoam, a plasticizer, a surfactant, a wetting agent, a protective colloid, filler, a coloring agent, an antiseptic, a biocide, a dispersing agent, a thickening agent, a thixotropic agent, an antifreeze agent, a pH adjusting agent, a corrosion inhibitor, an ultraviolet light stabilizer, a crosslinking promoter, an antioxidant, and another polymer.

33. An aqueous dispersion comprising the pressure-sensitive adhesive polymer of claim 11.

34. The aqueous dispersion of claim 33 further comprising at least one of a tackifier, an antifoam, a plasticizer, a surfactant, a wetting agent, a protective colloid, filler, a coloring agent, an antiseptic, a biocide, a dispersing agent, a thickening agent, a thixotropic agent, an antifreeze agent, a pH adjusting agent, a corrosion inhibitor, an ultraviolet light stabilize, a crosslinking promoter, an antioxidant, and another polymer.

35. A process comprising applying a pressure-sensitive adhesive polymer comprising a reaction product of a $C_1$ to $C_{20}$ alkyl (meth)acrylate, an ethylenically unsaturated carboxylic acid, a $C_2$ to $C_8$ hydroxyalkyl (meth)acrylate, a vinyl aromatic, an ethylenically unsaturated monomer containing sulfonic acid, and optionally a vinyl ester of a carboxylic acid to a substrate.

36. The process of claim 35, wherein the polymer comprises a reaction product of a $C_1$ to $C_{20}$ alkyl (meth)acrylate, an ethylenically unsaturated carboxylic acid, a $C_2$ to $C_8$ hydroxyalkyl (meth)acrylate, a vinyl aromatic, a ethylenically unsaturated monomer containing sulfonic acid, and a vinyl ester of a carboxylic acid.

37. The process of claim 35, wherein the polymer comprises a reaction product of 2–ethylhexyl acrylate, acrylic acid, hydroxypropyl acrylate, styrene, sodium vinyl sulfonate, and optionally vinyl acetate.

38. The process of claim 35, wherein the polymer comprises a reaction product of 2–ethylhexyl acrylate, acrylic acid, hydroxypropyl acrylate, styrene, sodium vinyl sulfonate, and vinyl acetate.

39. The process of claim 35, wherein the polymer comprises a reaction product by weight of from about 80% to about 99% $C_1$ to $C_{20}$ alkyl (meth)acrylate, from about 0.25% to about 2.5% ethylenically unsaturated carboxylic acid, from greater than 0% to about 3% $C_2$ to $C_8$ hydroxyalkyl (meth)acrylate, from greater than 0% to about 3% vinyl aromatic, from greater than 0% to about 1% ethylenically unsaturated monomer containing sulfonic acid, and from 0% to about 8% vinyl ester of a carboxylic acid.

40. The process of claim 35, wherein the polymer comprises a reaction product by weight of from about 80% to about 99% $C_1$ to $C_{20}$ alkyl (meth)acrylate, from about 0.25% to about 2.5% ethylenically unsaturated carboxylic acid, from greater than 0% to about 3% $C_2$ to $C_8$ hydroxyalkyl (meth)acrylate, from greater than 0% to about 3% vinyl aromatic, from greater than 0% to about 1% ethylenically unsaturated monomer containing sulfonic acid, and from greater than 0% to about 8% vinyl ester of a carboxylic acid.

41. The process of claim 35, wherein the polymer comprises a reaction product by weight of from about 80% to about 99% 2-ethylhexyl acrylate, from about -0.25 to about 2.5% acrylic acid, from greater than 0% to about 3% hydroxypropyl acrylate, from greater than 0% to about 3% styrene, from greater than 0% to about 1% sodium vinyl sulfonate, and from 0% to about 8% vinyl acetate.

42. The process of claim 35, wherein the polymer comprises a reaction product by weight of from about 85% to about 96% 2-ethylhexyl acrylate, from about 0.25 to about 2% acrylic acid, from greater than 0% to about 3% hydroxypropyl acrylate, from greater than 0% to about 3% styrene, from greater than 0% to about 1% sodium vinyl sulfonate, and 0% to about 8% vinyl acetate.

43. The process of claim 35, wherein the polymer comprises a reaction product by weight of from about 85% to about 96% 2-ethylhexyl acrylate, from about 0.25 to about 2% acrylic acid, from greater than 0% to about 3% hydroxypropyl acrylate, from greater than 0% to about 3% styrene, from greater than 0% to about 1% sodium vinyl sulfonate, and from greater than 0% to about 8% vinyl acetate.

44. The process of claim 35, wherein the polymer comprises a reaction product by weight of from about 85.8% to about 95.55% 2-ethylhexyl acrylate, from about 0.25 to about 2% acrylic acid, about 2% hydroxypropyl acrylate, about 2% styrene, about 0.2% sodium vinyl sulfonate, and from 0% to about 8% vinyl acetate.

45. The process of claim 35, wherein the polymer comprises a reaction product by weight of from about 85.8% to about 95.55% 2-ethylhexyl acrylate, from about 0.25 to about 2% acrylic acid, about 2% hydroxypropyl acrylate, about 2% styrene, about 0.2% sodium vinyl sulfonate, and from greater than 0% to about 8% vinyl acetate.

46. The process of claim 35, wherein the polymer further comprises at least one of a takifier, an antifoam, a plasticizer, a surfactant, a wetting agent, a protective colloid, filler, a coloring agent, an antiseptic, a biocide, a dispersing agent, a thickening agent, a thixotropic agent, an antifreeze agent, a pH adjusting agent, a corrosion inhibitor, an ultraviolet light stabilizer, a crosslinking promoter, an antioxidant, and another polymer.

47. The process of claim 35, wherein the polymer has a glass transition temperature $\leq -10°$ C.

48. The process of claim 35, wherein the polymer has a glass transition temperature ranging from about $-85°$ C. to $-10°$ C.

49. The process of claim 35, wherein the polymer has a glass transition temperature ranging from about $-85°$ C. to $-10°$ C.

50. The process of claim 37, wherein the polymer has a glass transition temperature $\leq -10°$ C.

51. The process of claim 37, wherein the polymer has a glass transition temperature ranging from about $-85°$ C. to $-10°$ C.

52. The process of claim 37, wherein the polymer has a glass transition temperature ranging from about $-85°$ C. to $-54°$ C.

53. The process of claim 37, wherein the polymer has at least one of: a. a 180° peel as measured by ASTM 3330 on polyethylene at room temperature of from about 70 N/m (0.4 lb/in) to about 210 N/m (1.2 lb/in), b. a 180° peel as measured by ASTM 3330 on corrugated paper at room temperature of from about 175 N/m (1.0 lb/in) to about 438 N/m (2.5 lb/in), c. a 180° peel as measured by ASTM 3330 on polyethylene at $-23.3°$ C. ($-10°$ F.) of from about 8.7 N/m (0.05 lb/in) to about 35 N/m (0.2 lb/in), d. a 180° peel as measured by ASTM 3330 on corrugated paper at $-23.3°$ C. ($-10°$ F.) of from about 175 N/m (1/0 lb/in) to about 438 N/m (2.5 lb/in), and e. a shear holding strength as measured by ASTM D3654 of from 50 minutes to about 2000 minutes.

54. The process of claim 35, wherein the polymer has: a. a 180° peel as measured by ASTM 3330 on polyethylene at room temperature of from about 70 N/m (0.4 lb/in) to about 210 N/m (1.2 lb/in), b. a 180° peel as measured by ASTM 3330 on corrugated paper at room temperature of from about 175 N/m (1.0 lb/in) to about 438 N/m (2.5 lb/in), c. a 180° peel as measured by ASTM 3330 on polyethylene at $-23.3°$ C. ($-10°$ F.) of from about 8.7 N/m (0.05 lb/in) to about 35 N/m (0.2 lb/in), d. a 180° peel as measured by ASTM 3330 on corrugated paper at $-23.3°$ C. ($-10°$ F.) of from about 175 N/m (1.0 lb/in) to about 4438 N/m (2.5 lb/in), and e. a shear holding strength as measured by ASTM D3654 of from 50 minutes to about 2000 minutes.

55. The process of claim 37, wherein the polymer has at least of: a. a 180° peel as measured by ASTM 3330 on polyethylene at room temperature of from about 70 N/m (0.4 lb/in) to about 210 N/m (1.2 lb/in), b. a 180° peel as measured by ASTM 3330 on corrugated paper at room temperature of from about 175 N/m (1.0 lb/in) to about 438 N/m (2.5 lb/in), c. a 180° peel as measured by ASTM 3330 on polyethylene at $-23.3°$ C. ($-10°$ F.) of from about 8.7 N/m (0.05 lb/in) to about 35 N/m (0.2 lb/in), d. a 180° peel as measured by ASTM 3330 on corrugated paper at $-23.3°$ C. ($-10°$ F.) of from about 175 N/m (1.0 lb/in) to about 438 N/m (2.5 lb/in), and e. a shear holding strength as measured by ASTM D3654 of form 50 minutes to about 2000 minutes.

56. The process of claim 37, wherein the polymer has: a. a 180° peel as measured by ASTM 3330 on polyethylene at room temperature of from about 70 N/m (0.4 lb/in) to about 210 N/m (1.2 lb/in), b. a 180° peel as measured by ASTM 3330 on corrugated paper at room temperature of from about 175 N/m (1.0 lb/in) to about 438 N/m (2.5 lb/in), c. a 180° peel as measured by ASTM 3330 on polyethylene at $-23.3°$ C. ($-10°$ F.) of from about 8.7 N/m (0.05 lb/in), d. a 180° peel as measured by ASTM 3330 on corrugated paper at $-23.3°$ C. ($-10°$ F.) of from about 175 N/m (1.0 lb/in) to about 438 N/m (2.5 lb/in), and e. a shear holding strength as measured by ASTM D3654 of from 50 minutes to about 2000 minutes.

* * * * *